(12) United States Patent
Stewart et al.

(10) Patent No.: US 10,215,368 B2
(45) Date of Patent: Feb. 26, 2019

(54) ENERGY EFFICIENT COMMUNICATION AND DISPLAY DEVICE

(71) Applicant: Applied Materials, Inc., Santa Clara, CA (US)

(72) Inventors: Michael P. Stewart, San Francisco, CA (US); Hann-Ching Chao, San Carlos, CA (US); Daniel Paul Forster, San Jose, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 186 days.

(21) Appl. No.: 15/173,231

(22) Filed: Jun. 3, 2016

(65) Prior Publication Data
US 2017/0350576 A1   Dec. 7, 2017

(51) Int. Cl.
| | |
|---|---|
| G02F 1/1343 | (2006.01) |
| G02F 1/1339 | (2006.01) |
| G02F 1/137 | (2006.01) |
| F21V 14/00 | (2018.01) |
| F21V 9/14 | (2006.01) |
| F21V 8/00 | (2006.01) |
| G02F 1/13 | (2006.01) |

(52) U.S. Cl.
CPC .............. *F21V 14/003* (2013.01); *F21V 9/14* (2013.01); *G02B 6/0053* (2013.01); *G02B 6/0056* (2013.01); *G02B 6/0065* (2013.01); *G02F 1/1303* (2013.01); *G02F 1/1339* (2013.01); *G02F 1/13439* (2013.01); *G02F 1/13781* (2013.01)

(58) Field of Classification Search
CPC .. G02B 6/0053; G02B 6/0056; G02F 1/13781
See application file for complete search history.

(56) References Cited

U.S. PATENT DOCUMENTS

| | | | |
|---|---|---|---|
| 5,831,698 A | 11/1998 | Depp et al. | |
| 5,877,829 A | 3/1999 | Okamoto et al. | |

(Continued)

FOREIGN PATENT DOCUMENTS

| | | | |
|---|---|---|---|
| JP | 2003270668 A | 9/2003 | |
| JP | 2005027210 A | 1/2005 | |

(Continued)

OTHER PUBLICATIONS

International Search Report and Written Report in related application PCT/US20171031736 dated Jul. 25, 2017.

(Continued)

*Primary Examiner* — Lucy P Chien
(74) *Attorney, Agent, or Firm* — Patterson + Sheridan, LLP

(57) ABSTRACT

An adaptive backlight module and a method and system for producing an adaptive backlight module are described herein. In one example, an adaptive backlight module includes a light source, a polarizer, at least one enhancement film disposed between the light source and the polarizer, and a diffuser disposed between the light source and the enhancement film. The diffuser includes a first electrode coupled to a first substrate and a second electrode coupled to a second substrate. A liquid crystal layer is disposed between the first electrode and the second electrode of the diffuser.

9 Claims, 9 Drawing Sheets

(56) References Cited

U.S. PATENT DOCUMENTS

| | | | |
|---|---|---|---|
| 2009/0059120 A1* | 3/2009 | Hoshi | G02B 6/0053 349/62 |
| 2011/0102311 A1 | 5/2011 | Nango et al. | |
| 2012/0122549 A1 | 5/2012 | Rasmussen et al. | |
| 2014/0055717 A1 | 2/2014 | Benson et al. | |
| 2015/0009307 A1* | 1/2015 | Lee | G02F 1/133504 348/54 |
| 2015/0301384 A1* | 10/2015 | Koike | G02F 1/1336 349/65 |

FOREIGN PATENT DOCUMENTS

| | | |
|---|---|---|
| JP | 2008203475 A | 9/2008 |
| WO | 2011/162483 A2 | 12/2011 |

OTHER PUBLICATIONS

Bastawros, et al.; SID Information Display; Diffuser Films and Optical Performance in LCDs; dated Jan. 2012; 9 total pages.

* cited by examiner

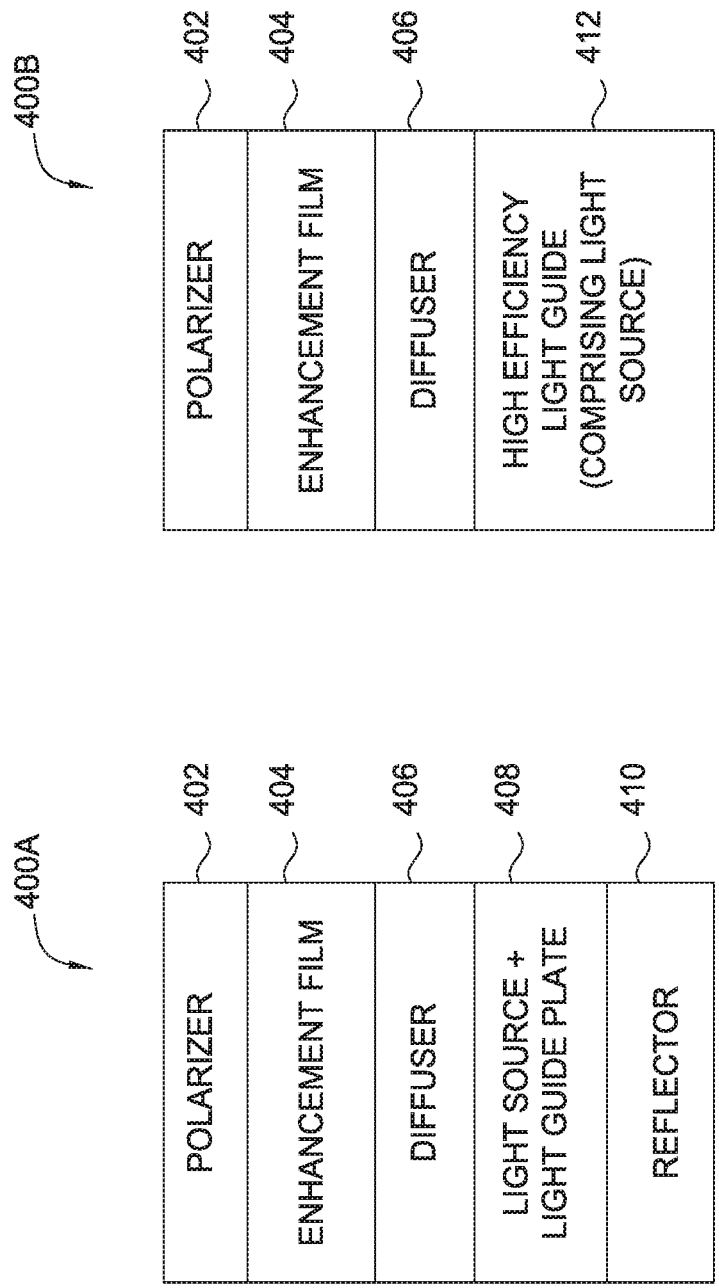

ENERGY EFFICIENT COMMUNICATION AND DISPLAY DEVICE

FIELD

Embodiments of the disclosure generally relate to an adaptive backlight module for a display and a method and system for fabricating the same.

BACKGROUND

Backlight units for display devices are often one of the largest draws on power consumption, causing battery endurance to be limited in mobile electronics. Often a large portion of the light exiting a display screen is not needed for a single user, and is vulnerable to being viewed by non-users in the line of sight. Many current privacy filters and films for laptops, monitors, and some mobile devices absorb light, thereby reducing energy efficiency of the device. Additionally, these current privacy filters and films are expensive, and are cumbersome in that they interfere with touch screen functionality and must be physically removed to enable wide-angle viewing of the display.

Thus, a need exists for techniques to reduce power consumption from the emission of excess light, and to provide privacy for a user.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 4A-4B are schematic views of an adaptive backlight module according to different embodiments.

To facilitate understanding, identical reference numerals have been used, where possible, to designate identical elements that are common to the figures. It is contemplated that elements and features of one embodiment may be beneficially incorporated in other embodiments without further recitation.

SUMMARY

An adaptive backlight module and method and system for producing an adaptive backlight module are described herein. In one embodiment, an adaptive backlight module includes a light source, a polarizer, at least one enhancement film disposed between the light source and the polarizer, and a diffuser disposed between the light source and the enhancement film. The diffuser includes a first electrode coupled to a first substrate and a second electrode coupled to a second substrate. A liquid crystal layer is disposed between the first electrode and the second electrode of the diffuser.

In another embodiment, a method of producing an adaptive backlight module is provided that includes forming a first electrode on a first substrate, forming a second electrode on a second substrate, forming at least one enhancement film on the first substrate, and forming a polarizer on the enhancement film. The method further includes forming a diffuser by forming a liquid crystal layer between the first electrode on the first substrate and the second electrode on the second substrate. The method also includes connecting the diffuser to a light source.

In another embodiment, a system for producing an adaptive backlight module includes a first chamber, configured to form a first electrode on a first substrate and a second electrode on a second substrate, and a second chamber, configured to form a diffuser by forming a liquid crystal layer between the first electrode on the first substrate and the second electrode on the second substrate.

DETAILED DESCRIPTION

Embodiments of the disclosure generally include an adaptive backlight module for a display and a method and system for fabricating the same.

Figure 1:
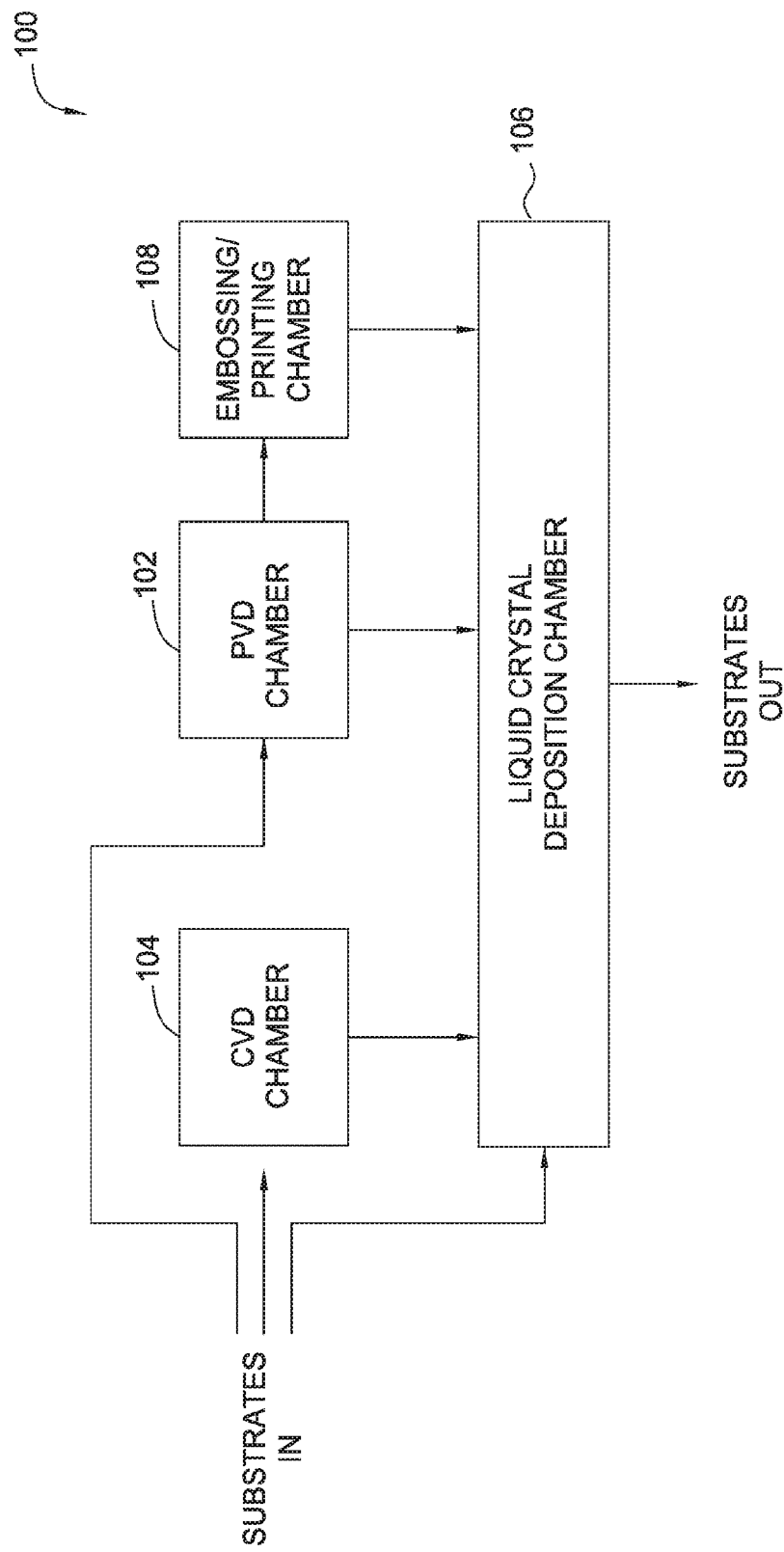
FIG. 1 is a system for producing an adaptive backlight module according to one embodiment.

FIG. 1 is a system for producing an adaptive backlight module according to one embodiment. The system 100 may include a physical vapor deposition (PVD) chamber 102, a chemical vapor deposition (CVD) chamber 104, an embossing/printing chamber 108, and a liquid crystal deposition chamber 106. According to one embodiment, for production of an adaptive backlight module, substrates may first enter either the PVD chamber 102 for processing, as described with respect to FIGS. 3A-3C below, or the CVD chamber 104 for processing, as described with respect to FIG. 2 below. In one embodiment, if the substrate first enters the CVD chamber 104, the substrate will then directly enter the liquid crystal deposition chamber 106 for processing. If the substrate first enters a PVD chamber 102, the substrate might next enter the embossing/printing chamber 108 for processing, before it then enters the liquid crystal deposition chamber 106 for processing, or alternatively, the substrate may directly enter the liquid crystal deposition chamber 106 from the PVD chamber 102 for processing. In an alternative embodiment, pre-formed substrates may enter the liquid crystal deposition chamber without first entering any other chambers. The substrates may then be removed from the liquid crystal deposition chamber 106 to be connected to a light guide plate, a reflector, and a light source to form an adaptive backlight module. In alternative embodiments, the system 100 may not include a PVD chamber 102, the system may not include an embossing/printing chamber 108, and/or the system may not include a CVD chamber 104.

Figure 2:
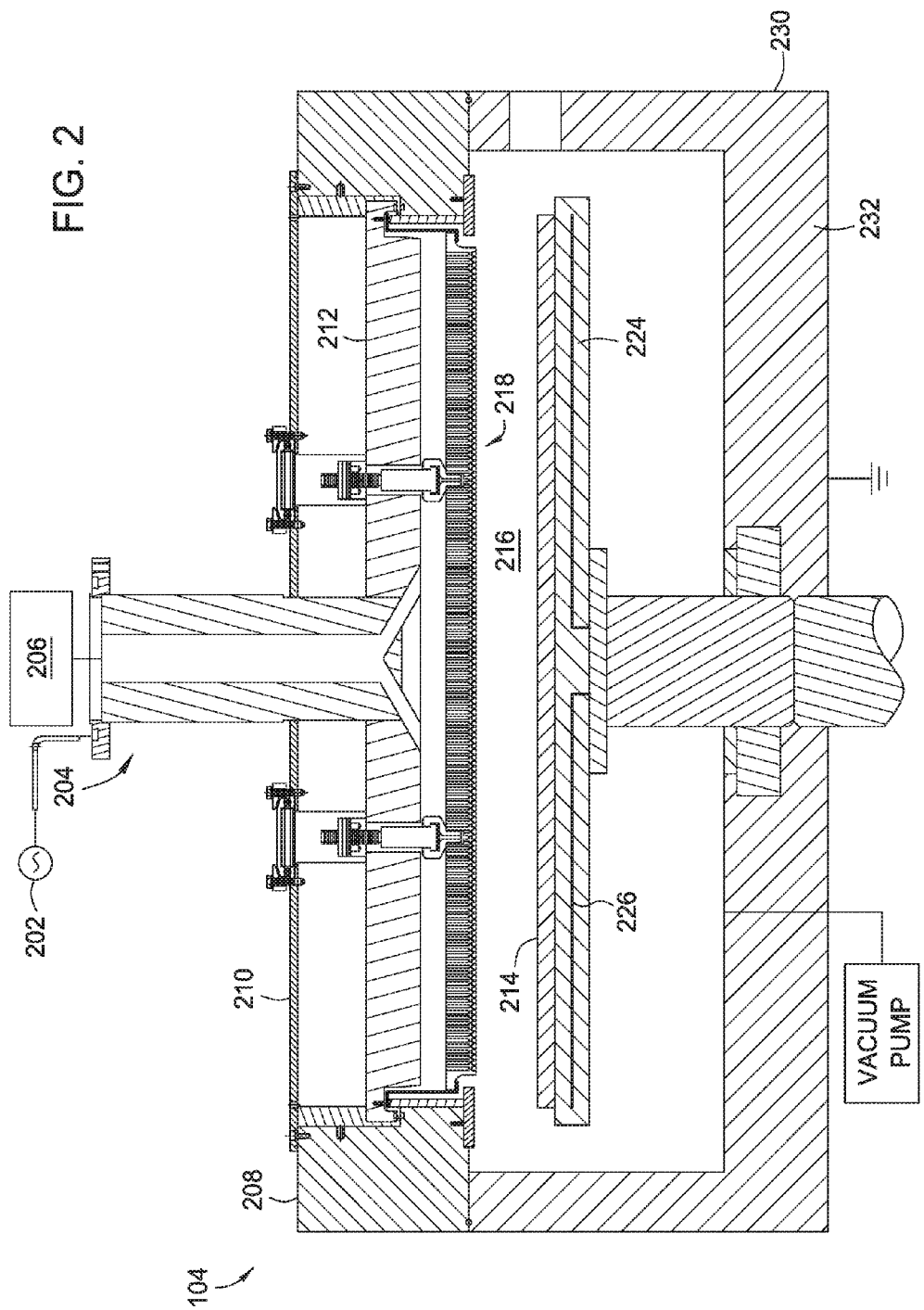
FIG. 2 is a schematic side cross-sectional view of a chemical vapor deposition processing chamber according to one embodiment of the system in FIG. 1.

FIG. 2 is a schematic side cross-sectional view of a CVD processing chamber 104 according to one embodiment. A plasma enhanced chemical vapor deposition (PECVD) system, such as a PECVD system available from Applied Materials, Inc., located in Santa Clara, Calif. is described. However, it should be understood that other chemical vapor deposition chambers could be utilized.

The CVD chamber 104 is suitable for performing PECVD processes for fabricating circuitry on a large area substrate 214. The large area substrate 214 may be made of glass, a polymer, or other suitable substrate. The CVD chamber 104 is configured to form structures and devices on the large area substrate 214 for use in the fabrication of liquid crystal displays (LCD's) or flat panel displays, photovoltaic devices for solar cell arrays, or other structures. The structures may include thin film transistors and p-n junctions utilized to form diodes for photovoltaic cells, among other structures.

The CVD chamber 104 includes a chamber sidewall 230, a bottom 232, and a substrate support 224. The substrate support 224, such as a susceptor, supports the substrate 214 during processing. A heater element 226, such as a resistive heater, disposed in the substrate support 224, is coupled to plasma source 202 and is utilized to controllably heat the substrate support 224 and large area substrate 214 positioned thereon to a predetermined temperature. The CVD chamber 104 also includes a lid structure 208, a backing plate 212, a cover plate 210, and a gas distribution showerhead 218. The gas distribution showerhead 218 is positioned opposite the substrate support 224 and the large area substrate 214.

The CVD chamber 104 has a gas inlet 204 that is coupled to a gas source 206 and a plasma source 202. The plasma source 202 may be a direct current power source, a radio frequency (RF) power source, or a remote plasma source. The gas inlet 204 delivers process and/or cleaning gases from the gas source 206 to a processing region 216 defined in an area below the gas distribution showerhead 218 and above the substrate support 224. Gases present in the processing region 216 may be energized by the plasma source 202 to form a plasma. The plasma is utilized to deposit a layer of material on the substrate 214. Although the plasma source 202 is shown coupled to the gas inlet 204 in this embodiment, the plasma source 202 may be coupled to the gas distribution showerhead 218 or other portions of the CVD chamber 104.

Figure 3A:
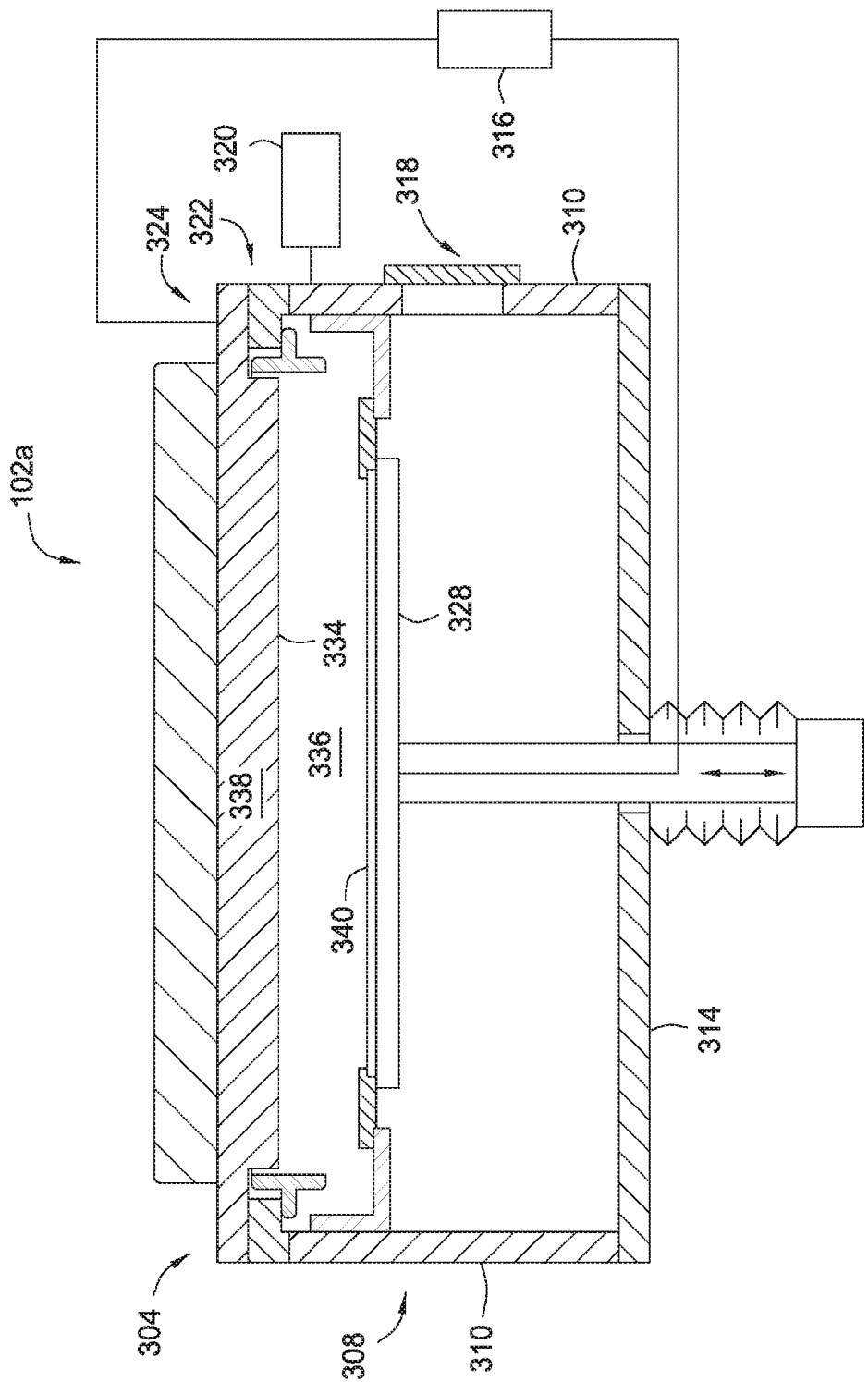
FIG. 3A is a schematic side cross-sectional view of a physical vapor deposition processing chamber according to one embodiment of the system in FIG. 1.

FIG. 3A is a schematic side cross-sectional view of a PVD processing chamber 102 from FIG. 1 according to a first embodiment. The first embodiment shown in FIG. 3A is a PVD processing chamber 102a. One example of the PVD chamber 102a that may be adapted to benefit from the disclosure is a physical vapor deposition (PVD) process chamber, available from Applied Materials, Inc., located in Santa Clara, Calif. However, it should be understood that other physical vapor deposition chambers could be utilized.

The PVD chamber 102a includes a chamber body 308 and a lid assembly 304, defining a process volume 336. The chamber body 308 is typically fabricated from a unitary block of aluminum or welded stainless steel plates. The chamber body 308 generally includes sidewalls 310 and a bottom 314. The sidewalls 310 and/or bottom 314 generally include a plurality of apertures, such as an access port 318 and a pumping port (not shown). The pumping port is coupled to a pumping device (also not shown) that evacuates and controls the pressure within the process volume 336. The pumping device is able to maintain the pressure of the PVD chamber 102a to a certain vacuum level.

The lid assembly 304 generally includes a target 334 and a ground shield assembly 322 coupled thereto. The target 334 provides a material source that can be deposited onto the surface of a substrate 340 during a PVD process. The target 334 or target plate may be fabricated of a material that will become the deposition species or it may contain a coating of the deposition species. To facilitate sputtering, a high voltage power supply, such as a power source 316 is connected to the target 334.

The target 334 generally includes a peripheral portion 324 and a central portion 338. The peripheral portion 324 is disposed over the sidewalls 310 of the chamber. The central portion 338 of the target 334 may protrude, or extend in a direction towards a substrate support 328. The substrate support 328 is generally disposed on the bottom 314 of the chamber body 308 and supports the substrate 340 thereupon during substrate processing within the PVD chamber 102a. The substrate support 328 may include one or more electrodes and/or heating elements imbedded within the plate-like body support.

During a sputtering process to deposit a material on the substrate 340, the target 334 and the substrate support 328 are biased relative each other by the power source 316. A process gas, such as inert gas and other gases, e.g., argon, and nitrogen, is supplied to the process volume 336 from a gas source 320 through one or more apertures (not shown), typically formed in the sidewalls 310 of the PVD chamber 102a. The process gas is ignited into a plasma and ions within the plasma are accelerated toward the target 334 to cause target material being dislodged from the target 334 into particles. The dislodged material or particles are attracted towards the substrate 340 through the applied bias, depositing a film of material onto the substrate 340.

Figure 3B:
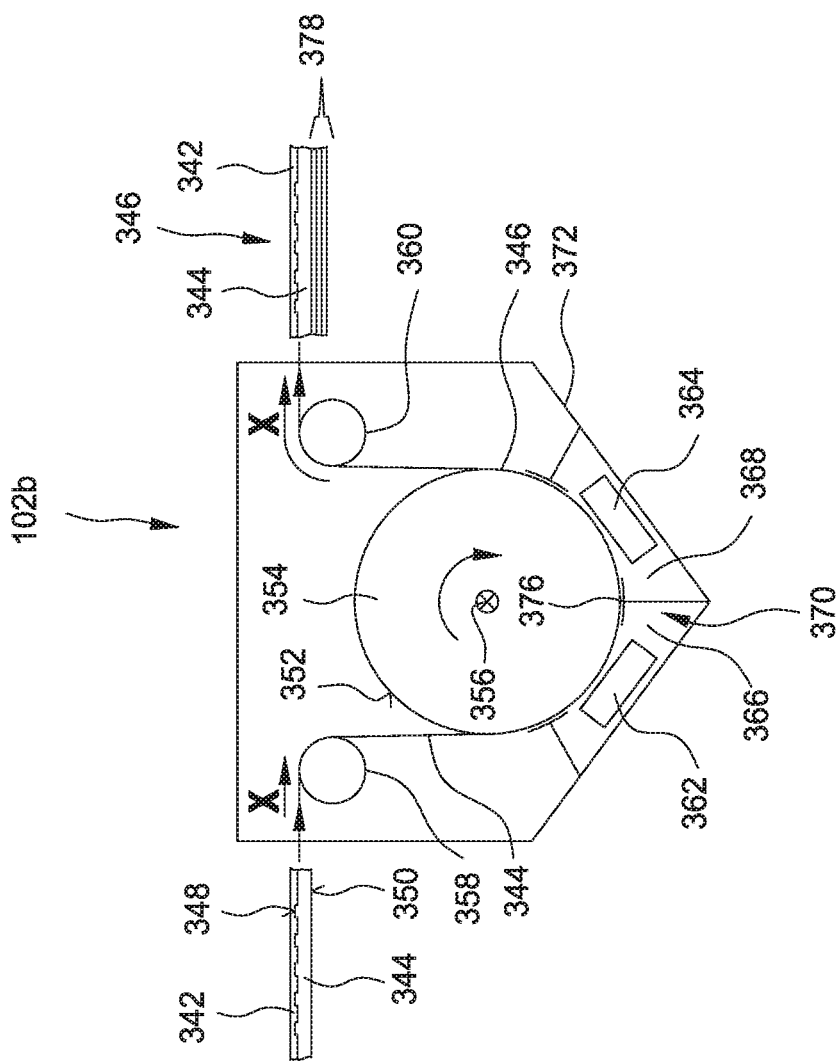
FIG. 3B is a schematic side cross-sectional view of a roll-to-roll physical vapor deposition processing chamber according to one embodiment of the system in FIG. 1.

FIG. 3B is a schematic side cross-sectional view of a PVD processing chamber 102 according to a second embodiment. The second embodiment shown in FIG. 3B is an in-line, roll-to-roll PVD processing chamber 102b. However, it should be understood that other in-line physical vapor deposition chambers could be utilized.

The roll-to-roll PVD chamber 102b is configured for depositing material 378 on a flexible substrate 344. The roll-to-roll PVD chamber 102b may include at least a first vacuum processing region 366 and a second vacuum processing region 368 which may be separated from each other by at least one gas separation unit 370, wherein a gas separation passage 376 configured as a passageway for the flexible substrate 344 is provided therebetween.

The roll-to-roll PVD chamber 102b includes a vacuum chamber 372. Various vacuum deposition techniques can be used to deposit material on the flexible substrate 344. The flexible substrate 344 is guided, as indicated by arrow X, into the vacuum chamber 372. For example, the flexible substrate 344 can be guided into the vacuum chamber 372 from an unwinding station. The flexible substrate 344 is directed by rollers 358 to a substrate support configured for supporting the flexible substrate 344 during processing and/or deposition. As shown in FIG. 3B, particularly for roll-to-roll deposition apparatuses, the substrate support can be a coating drum 354, which is rotatable around a rotation axis 356. From the coating drum 354, the flexible substrate 344 is guided to a further roller 360 and out of the vacuum chamber 372, as indicated by the second arrow X.

The embodiment depicted in FIG. 3B includes a first deposition source 362 provided in the first vacuum processing region 366, and a second deposition source 364 provided in the second vacuum processing region 368. In the vacuum processing regions 366, 368, the flexible substrate 344 is supported by the coating drum 354 while being processed. Yet, it is to be understood that according to further embodiments, which can be combined with other embodiments described herein, more than two deposition sources can be provided. For example, four, five, six, or even more deposition sources can be provided.

The flexible substrate 344 has a self-adhesive first main surface 348 which can be covered with a protection layer 342 configured as a release liner. The flexible substrate 344 may be guided on the support surface 352 of the rotatable coating drum 354, wherein the first main surface 348 is directed toward the rotatable coating drum 354. However, as the first main surface 348 may be covered with the protection layer 342, the first main surface 348 does not directly come into contact with the support surface 352.

The deposited material 378 is vacuum deposited on the second main surface 350 of the flexible substrate 344 which is directed away from the rotatable coating drum 354 via the first deposition source 362 in the first vacuum processing region 366 and via the second deposition source 364 in the second vacuum processing region 368. After vacuum deposition, the protection layer 342 covering the first main surface 348 may be removed, and the multilayer substrate 346 may be ready for use.

Figure 3C:
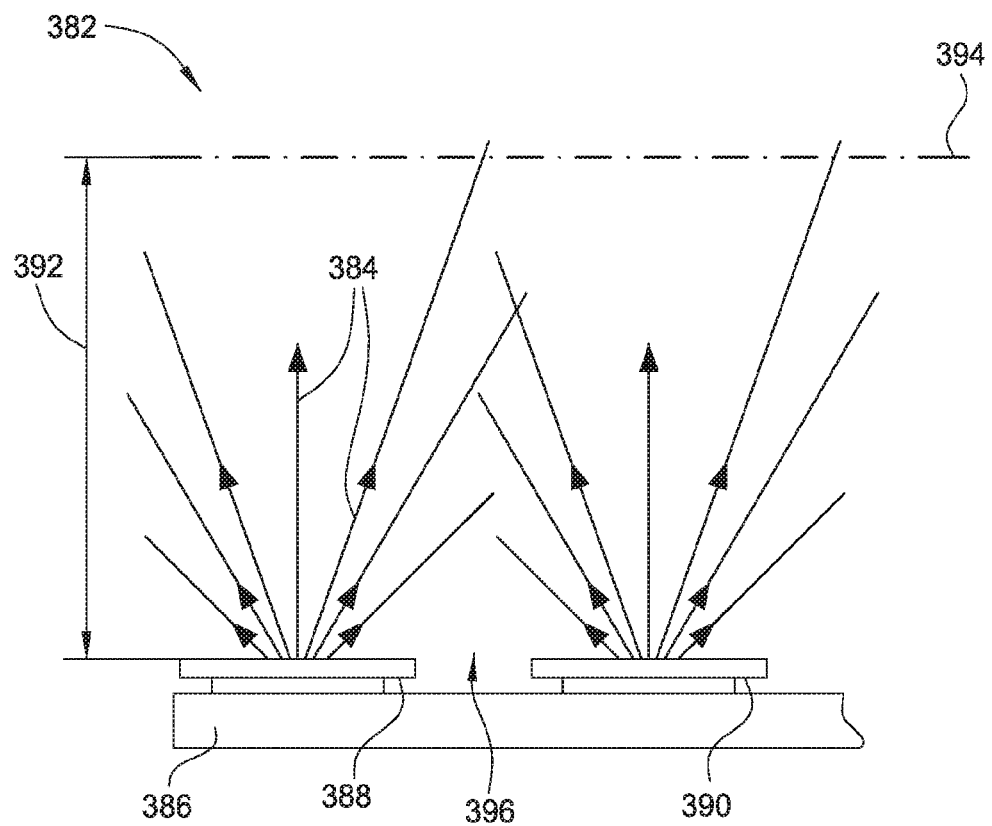
FIG. 3C is a schematic side cross-sectional view of a rotatable target assembly of a physical vapor deposition processing chamber according to one embodiment of the system in FIG. 1.

FIG. 3C is a schematic view of a rotatable target assembly of a PVD processing chamber 102 according to a third embodiment. However, it should be understood that other rotatable target assemblies or cathodes could be utilized in a physical vapor deposition chamber.

FIG. 3C is a schematic view of a rotatable target assembly 382. FIG. 3C shows the distribution of released particles 384 as arrows. The rotatable target assembly 382 has a target support 386 and several target elements 388, 390. The target assembly 382 and the target support 386 are rotatable.

The distribution field of deposition material can be understood as including substantially all particles 384 released from the target elements 388, 390. Arrows denote the direction of the released particles 384 of the target elements 388, 390. For instance, the distribution field of deposition material of target element 388 includes all particles 384 originating from the target element 388. According to some embodiments, the distribution field may have substantially the shape of a cosine function. The length of arrows indicates approximately the number of particles 384 released in the direction of the arrow. For instance, the arrow going straight upwards presents the direction of a defined number of released particles 384, whereas the arrow to the left or right of the straight arrow presents a smaller number of particles 384. The target-substrate-distance 392 reaches from the target elements 388 and 390 to a plane 394 of a substrate surface.

According to some embodiments, the target support 386 and the substrate support of a deposition chamber may be adapted to be movable with respect to each other. For instance, the target support 386 and/or the substrate support may be adapted to adjust the distance between the plane 394 of the substrate surface and the target elements 388, 390. Typically, the distance between the plane 394 of the substrate surface and the target elements 388, 390 of the rotatable target assembly 382 may be adjusted dependent on the gap 396 between the target elements 388, 390 of the rotatable target assembly 382 before using the rotatable target assembly 382 in a deposition process.

FIG. 4A is a schematic view of an adaptive backlight module 400A according to one embodiment. The adaptive backlight module 400A has a reflector 410. A light source and light guide plate 408 are on the reflector 410. The light source may be one or more cold cathode fluorescent lamps (CCFL), one or more light-emitting diodes (LED), one or more organic light-emitting diodes (OLED), or any other suitable point source for a display device.

A switchable diffuser 406 is on the light source and light guide plate 408. At least one enhancement film 404 is on the switchable diffuser 406. For example, the enhancement film 404 may be a light recycling film, or any other brightness enhancing film tailored to a particular device's optical emission pattern. A polarizer 402 is on the enhancement film 404. For example, in one embodiment, the polarizer may be a wire grid polarizer.

FIG. 4B is a schematic view of an adaptive backlight module 400B according to a different embodiment. The adaptive backlight modules 400A, 400B may be utilized in a display device, such as a laptop, monitor, or a mobile device. The adaptive backlight module 400B has the polarizer 402, the enhancement film 404, and the switchable diffuser 406 of the embodiment of an adaptive backlight module 400A shown in FIG. 4A. However, adaptive backlight module 400B has a high efficiency light guide comprising a light source 412 instead of having the light source and light guide plate 408 and the reflector 410 of the adaptive backlight module 400A. For example, the high efficiency light guide comprising a light source 412 may be a single molded part with LEDs embedded in a light guide material, such as polymethyl-methacrylate (PMMA), ZEONOR™ or polycarbonate (PC). The high efficiency light guide 412 may also have a reflector integrated into the single molded part. For example, the reflector may be formed using a PVD process on the high efficiency light guide 412.

Figure 5:
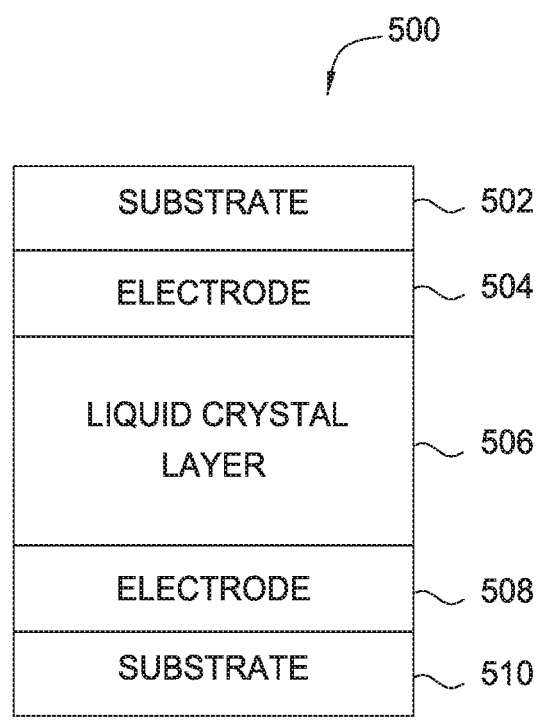
FIG. 5 is a schematic view of a switchable diffuser stack in an adaptive backlight module according to one embodiment.

FIG. 5 includes a schematic view of a switchable diffuser stack 500 in an adaptive backlight module according to one embodiment. The switchable diffuser stack 500 may comprise the switchable diffuser 406 in adaptive backlight module 400A from FIG. 4A or in adaptive backlight module 400B from FIG. 4B. The switchable diffuser stack 500 has a first substrate 502 with an electrode 504 thereon, and a second substrate 510 with an electrode 508 thereon. The electrodes 504, 508 may each be a substantially transparent electrode, such as an indium tin oxide (ITO) film. The electrode 504 on the first substrate 502 faces the electrode 508 on the second substrate 510. A liquid crystal layer 506 is disposed between the electrode 504 on the first substrate 502 and the electrode 508 on the second substrate 510. In some embodiments, a dielectric barrier layer may be disposed between the electrode 504 and the first substrate 502, and between the electrode 508 and the second substrate 510. For example, the dielectric barrier layers may be comprised of silicon oxynitride, silicon oxide, silicon nitride, tin oxide, titanium oxide, or zirconium oxide. The liquid crystal layer 506 may be comprised of liquid crystals and spacer elements. In one embodiment, the material for the spacer elements may be selected to match the refractive index of the liquid crystal as closely as possible to prevent light from scattering off the spacer elements. In one embodiment, the spacer elements may be between 5-200 micron spacer beads. The liquid crystals may be any liquid crystals that scatter upon application of an electric field of a different frequency. In one embodiment, the liquid crystals may be smectic phase liquid crystals, such as smectic A (SmA) phase liquid crystals, which can preserve transmissivity for a wide range of haze. For example, in one embodiment, the smectic phase liquid crystals may allow for 95% or greater transmissivity for a haze of anywhere from 3% to 95%.

Figure 6:
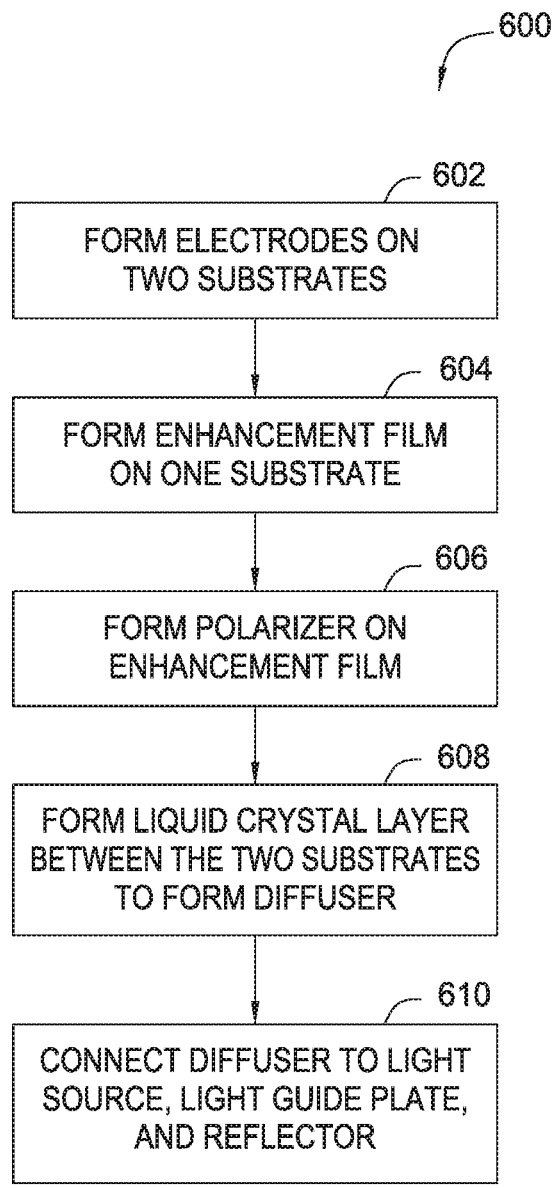
FIG. 6 is a flow chart depicting a method of forming an adaptive backlight module according to one embodiment.

FIG. 6 is a flow chart depicting a method 600 of forming an adaptive backlight module according to one embodiment. The method 600 begins at operation 602 by forming an electrode on each of two substrates. The electrodes may be formed on a lower surface of the first substrate, and on an upper surface of the second substrate. The electrodes may be formed planar to or patterned on the substrates. In some embodiments, a dielectric barrier layer may be formed on each substrate before the electrodes are formed thereon, such that the dielectric barrier layer is between each substrate and the electrode formed thereon. The electrodes may be formed using a PVD process as described above with respect to FIGS. 3A-3C. For example, on a glass substrate, the electrodes may be formed using the PVD process described above with respect to FIG. 3A or FIG. 3C. In another example, on a plastic substrate, the electrodes may be formed using a roll-to-roll PVD process as described above with respect to FIG. 3B. For example, each electrode may comprise an ITO film coated on polyethylene terephthalate (PET). Alternatively, the electrodes may be formed using a CVD process as described above with respect to FIG. 2. If a dielectric barrier layer is formed, the dielectric barrier layer may be formed using the same CVD or PVD process used to form the electrodes. Alternatively, the dielectric barrier layer may be formed using a different CVD or PVD process than the process used to form the electrodes. Accordingly, operation 602 may occur in a PVD chamber, such as the PVD chamber 102 shown in FIG. 1, in a CVD chamber, such as the CVD chamber 104 shown in FIG. 1, or in both (in the case that the dielectric layers are formed using a different process from the process used to form the electrodes). In an alternative embodiment, pre-formed substrates having an electrode already formed thereon may be used to form the adaptive backlight module. In this alternative embodiment, the method 600 would begin at operation 604, using the pre-formed substrates having an electrode layer pre-formed thereon.

In operation 604, at least one enhancement film may be formed on the first substrate on which the electrode is formed in operation 602. The enhancement film may be formed on the upper surface of the first substrate, opposite from the lower surface of the first substrate on which the electrode is formed in operation 602. The enhancement film may be formed on the substrate using an embossing, printing, or any other patterning process. Alternatively, the enhancement film may be formed using a CVD process as described above with respect to FIG. 2. Accordingly, operation 604 may occur in an embossing/printing chamber, such as the chamber 108 shown in FIG. 1, or in a CVD chamber, such as the CVD chamber 104 shown in FIG. 1.

In operation 606, after the enhancement film has been formed on the first substrate in operation 604, a polarizer may be formed on the enhancement film. The polarizer may be formed on the enhancement film using an embossing, printing, or any other patterning process. Alternatively, the polarizer may be formed on the enhancement film using a wire grid process, in which wires are placed into the enhancement film. Alternatively, the polarizer may be formed on the enhancement film using a CVD process as described above with respect to FIG. 2. Accordingly, operation 606 may occur in an embossing/printing chamber, such as the chamber 108 shown in FIG. 1, a metallization chamber (not shown in FIG. 1), or in a CVD chamber, such as the CVD chamber 104 shown in FIG. 1.

If a roll-to-roll or sheet-to-sheet PVD process is used to form the electrodes on the substrates in operation 602, the substrates may be rolls or sheets of substrates that are ultimately cut to form multiple individual substrates. The electrodes formed in operation 602, the enhancement film formed in operation 604, and/or the polarizer formed in operation 606 may all be formed on one substrate roll or sheet. The roll or sheet may then be cut to the sizes of individual displays before operation 608. In an alternative embodiment the polarizer formed in operation 606 may be formed on a substrate independent from the substrates on which the electrodes are formed in operation 602. In another alternative embodiment, the enhancement film formed in operation 604 may also be formed on a substrate independent from the substrates on which the electrodes are formed in operation 602.

In operation 608, a liquid crystal layer is formed between the two substrates on which the electrodes are formed in operation 602 to form a diffuser. In operation 608, the lower surface of the first substrate (having the electrode thereon) faces the upper surface of the second substrate (having the electrode thereon) when the liquid crystal layer is formed. The liquid crystal layer is formed between the electrode on the first substrate and the electrode on the second substrate. To form the liquid crystal layer, a plurality of spacer elements, such as spacer beads, is placed between the electrodes. The spacer elements are used so that liquid crystals may be uniformly deposited between the electrodes. Liquid crystals are deposited between the electrodes to surround the spacer elements and to bond the two substrates to each other, thus forming one diffuser element. The liquid crystals may be deposited using an inkjet printing process, a slot die coating process, a screen printing process, a stamp transfer process, a vacuum filling process, or any other suitable liquid or solid injection or deposition process. The liquid crystal layer may be formed in a chamber independent from the CVD chamber 104, the PVD chamber 102, and the embossing/printing chamber 108, as is shown by the liquid crystal deposition chamber 106 in the embodiment of the system shown in FIG. 1.

After the diffuser is formed in operation 608, a light source is connected to the diffuser to form an adaptive backlight module in operation 610. For example, the adaptive backlight module may be the adaptive backlight module 400A shown in FIG. 4A or the adaptive backlight module 400B shown in FIG. 4B. In one embodiment, the diffuser is connected to a light source, a light guide plate, and a reflector using a lamination assembly process in operation 610. In an alternative embodiment, the diffuser is connected a high efficiency light guide comprising a light source using a lamination assembly process in operation 610. In the alternative embodiments in which the enhancement film and/or the polarizer are formed on substrates independent from the substrates having the electrodes thereon that form the diffuser, the diffuser is connected to the substrate having the enhancement film and/or the substrate having the polarizer using a lamination assembly process in operation 610.

The adaptive backlight module described herein and the method and system for producing the same may allow for increased power efficiency when used in a display device, such as a liquid crystal display device. Electrodes on the diffuser of the adaptive backlight module may be electrically connected to a power source in a display device. For example, the electrodes 504, 508 in the switchable diffuser stack 500 shown in FIG. 5 may be electrically connected to a power source. An alternating electric field may be applied to the electrodes to alter the appearance of the diffuser and the viewing angle of the device display.

Figure 7A:
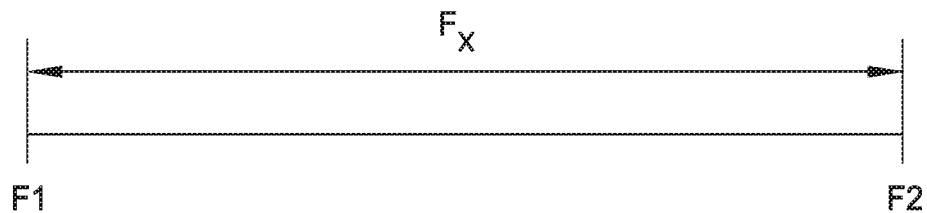
FIG. 7A illustrates frequency levels of an alternating electric field that may be applied in a display device to a switchable diffuser in an adaptive backlight module according to one embodiment.

FIG. 7A illustrates the frequency levels of the alternating electric field that may be applied to the electrodes on a switchable diffuser in an adaptive backlight module used in a display device, according to one embodiment. For example, an alternating current electric field with the frequency levels shown in FIG. 7A may be applied to the switchable diffuser stack 500 implemented in the adaptive backlight module 400A or 400B to switch the appearance of the diffuser. FIG. 7A illustrates the range of frequencies that may be applied from a low frequency F1 at a first end of the range, to a high frequency F2 at a second end of the range. When an electric field of a low frequency F1 is applied to a diffuser, the diffuser will appear translucent. When an electric field of a high frequency F2 is applied to the diffuser, the diffuser will appear transparent. In one embodiment, an alternating current field of +/−55V or approximate field of strength 100-400 V/m, cycled at 180 degrees phase, may be applied with the low frequency F1 in the range of 5-60 Hz, or with the high frequency F2 in the range of 500-5000 Hz. In one embodiment, the time required for switching to the high frequency F2 is 0-1 seconds, and the time required for switching to the low frequency F1 is 0-3 seconds.

Figure 7B:
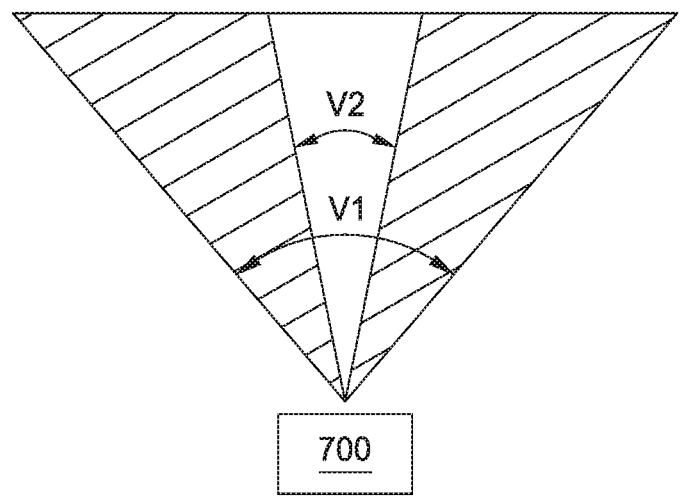
FIG. 7B illustrates the viewing angles corresponding to the frequencies of an electric field that may be applied in a display device to a diffuser in an adaptive backlight module according to one embodiment.

FIG. 7B illustrates the range of viewing angles of the display on a device 700 when an electric field with a frequency within the range shown in FIG. 7A is applied to a diffuser. When the electric field of the low frequency F1 is applied, and the diffuser appears translucent, the display may be seen from a first viewing angle V1. When an electric field of the high frequency F2 is applied, and the diffuser appears transparent, the display may be seen from a second viewing angle V2 that is narrower than the first viewing angle V1. The second, narrower viewing angle V2 may be used when a single user is using the device 700 to limit the amount of light emitted that is not needed for the single user, and to provide privacy for the single user by limiting the ability of non-users to see the display. The first, wider viewing angle V1 may be used when multiple viewers are viewing the display of the device 700. The second viewing angle V2 may have the same apparent brightness as the first viewing angle V1, but will require less power. For example, in one embodiment, there may be greater than 95% transmissivity of the diffuser when an electric field of either the low frequency F1 or the high frequency F2 is applied, but applying an electric field of the low frequency F1 results in greater than 90% haze, and applying an electric field of the low frequency F2 results in less than 5% haze. Thus, when only a single user is viewing the device, power can be saved and privacy can be obtained by applying an electric field of the high frequency F2, having the narrower viewing angle V2. However, if multiple viewers need to view the display, an electric field of the low frequency F1 can be applied to set a wider viewing angle V1. The viewing angle may be configured to switch automatically, or the viewing angle may be configured to switch upon user selection.

Additionally, as shown in FIG. 7A, an electric field of any frequency Fx between the low frequency F1 and the high frequency F2 may be applied to the diffuser, which results in the diffuser appearing somewhere between the translucent and transparent states. The viewing angle when an electric field of frequency Fx is applied to the diffuser will be between the first viewing angle V1 and the second viewing angle V2, as shown in the hatched region in FIG. 7B. In one embodiment, the intermediate frequency Fx range may be between 60-500 Hz, and the time required for switching to an intermediate frequency Fx may be less than the time required to switch to the low frequency F1 and/or the high frequency F2.

In the embodiments of the switchable diffuser 406 shown in FIGS. 4A and 4B, the switchable diffuser 406 is the only diffuser in each switchable diffuser module 400a, 400b. As such, when the high frequency F2 is applied to the switchable diffuser 406, and the switchable diffuser 406 appears transparent, there will be substantially no diffusion of the light. By contrast, if the switchable diffuser 406 were used in addition to a typical passive diffuser, the passive diffuser would still diffuse the light even when the switchable diffuser appears transparent. When only a single viewer is viewing the display, an electric field of the high frequency F2 can be applied, such that the switchable diffuser 406 is in the transparent state, with no other diffuser causing unnecessary diffusion or waste of light.

While the foregoing is directed to embodiments of the present disclosure, other and further embodiments of the disclosure may be devised without departing from the basic scope thereof, and the scope thereof is determined by the claims that follow.

What is claimed is:

1. An adaptive backlight module, comprising:
   a light source;
   a polarizer;
   at least one enhancement film disposed between the light source and the polarizer; and
   a diffuser disposed between the light source and the enhancement film comprising:
      a first electrode disposed on a first surface of a first substrate;
      a second electrode disposed on a first surface of a second substrate; and
      a liquid crystal layer disposed between and adjacent the first electrode and the second electrode, and wherein the enhancement film is disposed directly on a second surface of the first substrate, wherein the second surface is opposite the first surface and the polarizer is adjacent the enhancement film.

2. The adaptive backlight module of claim 1, wherein the light source comprises one of: one or more cold cathode fluorescent lamps (CCFL), one or more light-emitting diodes (LED), and one or more organic light-emitting diodes (OLED).

3. The adaptive backlight module of claim 1, further comprising:
   a light guide plate; and
   a reflector.

4. The adaptive backlight module of claim 1, wherein the liquid crystal layer comprises:
   smectic phase liquid crystals; and
   a plurality of spacer elements.

5. The adaptive backlight module of claim 4,
   wherein the first electrode comprises a first indium tin oxide (ITO) film; and
   wherein the second electrode comprises a second indium tin oxide (ITO) film.

6. The adaptive backlight module of claim 5,
   wherein the first electrode disposed on the first surface of the first substrate is a lower surface of the first substrate;
   wherein the second electrode disposed on the first surface of the second substrate is an upper surface of the second substrate; and
   wherein the lower surface of the first substrate faces the upper surface of the second substrate.

7. The adaptive backlight module of claim 1,
wherein the first electrode comprises a first indium tin oxide (ITO) film; and
wherein the second electrode comprises a second indium tin oxide (ITO) film.

8. The adaptive backlight module of claim 7,
wherein the first electrode disposed on the first surface of the first substrate is a lower surface of the first substrate;
wherein the second electrode disposed on the first surface of the second substrate is an upper surface of the second substrate; and
wherein the lower surface of the first substrate faces the upper surface of the second substrate.

9. The adaptive backlight module of claim 1, wherein the polarizer is disposed on the enhancement film.

* * * * *